US012288567B2

(12) United States Patent
Abbeloos et al.

(10) Patent No.: US 12,288,567 B2
(45) Date of Patent: Apr. 29, 2025

(54) METHOD FOR TRAINING A NEURAL NETWORK TO DESCRIBE AN ENVIRONMENT ON THE BASIS OF AN AUDIO SIGNAL, AND THE CORRESPONDING NEURAL NETWORK

(71) Applicants: TOYOTA MOTOR EUROPE, Brussels (BE); ETH ZURICH, Zurich (CH)

(72) Inventors: Wim Abbeloos, Brussels (BE); Arun Balajee Vasudevan, Zurich (CH); Dengxin Dai, Zurich (CH); Luc Van Gool, Zurich (CH)

(73) Assignees: TOYOTA JIDOSHA KABUSHIKI KAISHA, Toyota (JP); ETH ZÜRICH, Zurich (CH)

( * ) Notice: Subject to any disclaimer, the term of this patent is extended or adjusted under 35 U.S.C. 154(b) by 373 days.

(21) Appl. No.: 17/792,073

(22) PCT Filed: Jan. 10, 2020

(86) PCT No.: PCT/EP2020/050605
§ 371 (c)(1),
(2) Date: Jul. 11, 2022

(87) PCT Pub. No.: WO2021/139899
PCT Pub. Date: Jul. 15, 2021

(65) Prior Publication Data
US 2023/0047017 A1   Feb. 16, 2023

(51) Int. Cl.
| G06V 10/00 | (2022.01) |
| G06V 10/26 | (2022.01) |
| G06V 10/774 | (2022.01) |
| G06V 10/82 | (2022.01) |
| G06V 10/94 | (2022.01) |
| G06V 20/10 | (2022.01) |
| G10L 25/30 | (2013.01) |

(52) U.S. Cl.
CPC .............. *G10L 25/30* (2013.01); *G06V 10/26* (2022.01); *G06V 10/774* (2022.01); *G06V 10/82* (2022.01); *G06V 10/95* (2022.01); *G06V 20/10* (2022.01)

(58) Field of Classification Search
CPC ........... G06N 3/08; G06N 3/02; G06N 3/042; G06N 3/045; G06N 3/047; G06N 3/082; (Continued)

(56) References Cited

U.S. PATENT DOCUMENTS 10,372,991 B1 *  8/2019  Niemasik ............. G11B 27/031
10,977,872 B2 *  4/2021  Krishnamurthy ....... G06T 19/20
(Continued)

OTHER PUBLICATIONS

Gan et al.; "Self-supervised Moving Vehicle Tracking with Stereo Sound;" 2019 IEEE/CVF International Conference on Computer Vision (ICCV); 2019; pp. 7052-7061.
(Continued)

*Primary Examiner* — Amir Alavi
(74) *Attorney, Agent, or Firm* — Oliff PLC

(57) ABSTRACT

A neural network, a system using this neural network and a method for training a neural network to output a description of the environment in the vicinity of at least one sound acquisition device on the basis of an audio signal acquired by the sound acquisition device, the method including: obtaining audio and image training signals of a scene showing an environment with objects generating sounds, obtaining a target description of the environment seen on the image training signal, inputting the audio training signal to the neural network so that the neural network outputs a training description of the environment, and comparing the target description of the environment with the training description of the environment.

13 Claims, 3 Drawing Sheets

(58) Field of Classification Search
CPC .... G06N 3/092; G06N 3/0475; G06N 3/0454; G06N 3/0464; G06V 10/82; G06V 10/95; G06V 10/26; G06V 10/774; G06V 20/10; G10L 25/30

See application file for complete search history.

(56) References Cited

U.S. PATENT DOCUMENTS

| | | | | |
|---|---|---|---|---|
| 11,210,523 | B2 * | 12/2021 | Geng | G06V 10/764 |
| 11,375,293 | B2 * | 6/2022 | Kumar | G06N 3/08 |
| 11,381,888 | B2 * | 7/2022 | Krishnamurthy | G06N 3/04 |
| 11,727,913 | B2 * | 8/2023 | Verma | G10L 13/047 |
| | | | | 704/260 |
| 11,756,260 | B1 * | 9/2023 | Ponce | G06T 7/73 |
| | | | | 345/419 |
| 11,756,551 | B2 * | 9/2023 | Moritz | G10L 15/04 |
| | | | | 704/232 |
| 12,075,187 | B2 * | 8/2024 | Wang | G10L 15/26 |
| 2018/0096632 | A1 * | 4/2018 | Florez | G06V 20/20 |
| 2019/0174237 | A1 * | 6/2019 | Lunner | H04R 1/1041 |
| 2023/0047017 | A1 * | 2/2023 | Abbeloos | G06V 20/10 |

OTHER PUBLICATIONS

Aytar et al.; "SoundNet: Learning Sound Representations from Unlabeled Video;" 30th Conference on Neural Information Processing Systems (NIPS); 2016; pp. 1-9.

Gao et al.; "2.5D Visual Sound;" 2019 IEEE/CVF Conference on Computer Vision and Pattern Recognition (CVPR); 2019; pp. 324-333.

Chen et al.; "Encoder-Decoder with Atrous Separable Convolution for Semantic Image Segmentation;" Annual International Conference on the Theory and Applications of Cryptographic Techniques, Eurocrypt 2018; 2018; pp. 833-851.

Marchegiani et al.; "Leveraging the Urban Soundscape: Auditory Perception for Smart Vehicles;" 2017 IEEE International Conference on Robotics and Automation (ICRA); 2017; pp. 6547-6554.

Zhao et al.; "The Sound of Pixels;" Arvix:1804.03160; 2018; pp. 1-17.

Cordts et al.; "The Cityscapes Dataset for Semantic Urban Scene Understanding;" In Proc. of the IEEE Conference on Computer Vision and Pattern Recognition (CVPR); 2016; pp. 1-29.

Godard et al.; "Digging Into Self-Supervised Monocular Depth Estimation;" In Proceedings of the IEEE International Conference on Computer Vision; 2019; pp. 3828-3838.

Geiger et al.; "Vision meets Robotics: The KITTI Dataset;" International Journal of Robotics Research (IJRR); 2013; pp. 1-6.

Chen et al.; "Semantic Image Segmentation With Deep Convolutional Nets and Fully Connected CRFS;" IEEE transactions on pattern analysis and machine intelligence; 2017; pp. 834-848; vol. 40, No. 4.

Anonymous; "Auditory Semantic and Depth Perception with Binaural Sounds;" CVPR 2020 Submission #1702; 2020;. pp. 1-10.

Sep. 21, 2020 Search Report issued in International Patent Application No. PCT/EP2020/050605.

Sep. 21, 2020 Written Opinion of the International Searching Authority issued in International Patent Application No. PCT/EP2020/050605.

* cited by examiner

METHOD FOR TRAINING A NEURAL NETWORK TO DESCRIBE AN ENVIRONMENT ON THE BASIS OF AN AUDIO SIGNAL, AND THE CORRESPONDING NEURAL NETWORK

FIELD OF THE DISCLOSURE

The present disclosure is related to the field automatically describing the surroundings of a device, for example so as to perform a depth determination and/or a semantic determination. More precisely, the disclosure relates to using audio signals to describe an environment.

DESCRIPTION OF RELATED ART

Environments can be described automatically on the basis of images, for example using methods known to the person skilled in the art as semantic segmentation methods or depth determination methods.

Semantic segmentation methods have been used to differentiate objects having different types on an image. Depth determination methods can determine the distance between a point in space (for example the position of a camera) and the other objects visible on an image.

These methods are particularly useful in the fields of robotics or autonomous driving as they allow detecting cars, pedestrians, etc.

There exists a need for better detection of objects in a scene with auditory cues.

It has been observed that sound processing can be used to detect objects in a scene as well. For example, animals such as bats, dolphins, and some birds can "hear" their environment. To some extent, humans can also "hear" shapes, distances, and the density of objects around us.

From the prior art, document "Soundnet: Learning sound representations from unlabeled video» (Y. Aytar, C. Vondrick, and A. Torralba. In Advances in Neural Information Processing Systems, 2016) discloses the use of audio cues to detect scenes. This document more precisely proposes an audio-based scene recognition method by cross-domain distillation to transfer supervision from the visual domain to the audio domain.

From the prior art, the following documents are also known:
  "Self-supervised Moving Vehicle Tracking with Stereo Sound" (collected from https://arxiv.org/pdf/1910.11760.pdf); "2.5 visual sound" (collected from https://arxiv.org/pdf/1812.04204.pdf);
  Leveraging the Urban Soundscape: Auditory Perception for Smart Vehicles (collected from https://ieeexplore.ieee.org/document/7989774);
  Sound of pixels (collected from https://arxiv.org/pdf/1804.03160.pdf); and
  Objects that Sound (collected from https://arxiv.org/pdf/1610.09001).
  The known techniques are still not satisfactory.

SUMMARY

The present disclosure overcomes one or more deficiencies of the prior art by proposing a method for training a neural network to output a description of the environment in the vicinity of at least one sound acquisition device on the basis of an audio signal acquired by the sound acquisition device, the method comprising:

obtaining audio and image training signals of a scene showing an environment with objects generating sounds,
  obtaining a target description of the environment seen on the image training signal,
  inputting the audio training signal to the neural network so that the neural network outputs a training description of the environment, and
  comparing the target description of the environment with the training description of the environment.

The image training signal may include an image, a frame from a video, or multiple frames from the same video recorded simultaneously with the audio training signal.

In the present description, a description of the environment may include information on a plurality of objects, for example objects of predefined types (for example car, motorcycle, train), for example their location in space, typically a semantic segmentation map.

A description of the environment may also include information regarding the depth seen from a point in space. For example, the target description may include a semantic segmentation map based on the image training signal (and indicating the location of different types of predefined objects), and/or a depth map based on the image training signal. The neural network may then be configured to output a semantic segmentation map seen from the sound acquisition device used along with the neural network and a depth map also seen from this sound acquisition device.

The inventors of the present invention have observed that it is possible to use labelled training signals (i.e. for which the target description of the environment has already been obtained) so as to train the neural network which will only receive audio signals as input.

For example, the target description may be obtained by receiving instructions inputted by an operator describing the environment, or alternatively by using machine learning methods such as neural network to process the images (or the image or frame) of the image training signal.

It should be noted that the audio and image training signals have been acquired simultaneously at a same location so as to collect images and sound from the scene.

The comparing step may then be used to train the neural network, for example using the stochastic gradient method. This training modifies the weights and parameters of each layer of the neural network so as to obtain an updated neural network which would have outputted an output which is closer to the target description of the environment.

The training method can be an iterative training method in which the above steps of the method are repeated for several audio and video training signals According to a particular embodiment, the audio training signal is acquired with a plurality of sound acquisition devices.

Using a plurality of sound acquisition device has been observed to be particularity useful to obtain a neural network able to determine spatial differences. In a manner which is not substantially different from how humans detect objects, this is due to the interaural time difference: the difference of traveling distance for the sound between a left and a right ear.

Should a single sound acquisition device be used, this single sound acquisition device may still be able to detect the location of objects as closer objects may be louder than remote objects.

With a plurality of devices, even more precision is obtained and the result is analogous to the interaural level difference for a human.

According to a particular embodiment, the sound acquisition devices of the plurality of sound acquisition devices are all spaced apart from each other.

The arrangement of each sound acquisition device used to acquire the training audio signal may be chosen so as to enhance the determination of objects, for example by spacing sound acquisition devices like pairs of human ears.

According to a particular embodiment, wherein at least one additional sound acquisition device is used to acquire an audio signal at a location which differs from the location of any one of the sound acquisition devices of the plurality of sound acquisition devices, the neural network being further configured to determine at least one predicted audio signal representative of the audio signal that is acquired by the at least one additional sound acquisition device, and the method further comprising comparing the predicted audio signal with an audio signal acquired by the at least one additional sound acquisition device.

It has been observed that training the neural network to perform an additional task (determining the sound that could have been acquired at a specific location) greatly improves the training of the neural network even for other tasks (such as describing the environment). The comparing step involves a training, for example using the stochastic gradient method.

According to a particular embodiment, the audio training signal is acquired using at least one binaural sound acquisition device.

Using a binaural sound acquisition device allows benefiting from the phenomenon observed on humans called head-related transfer function. The way frequencies are received depends on the location of their emission. This phenomenon results from the pinna and the head affect the intensities of sound frequencies. Thus, additional cues resulting from the frequency based processing of binaural devices are obtained in binaural audio which allow differentiating locations of sound generating objects with a single binaural device.

According to a particular embodiment, the image training signal is acquired using a 360 degrees camera.

The use of a 360 degrees camera provides more information to be used as input, and it also reflects the properties of sound travelling around objects.

According to a particular embodiment the target description is obtained using at least one pre-trained neural network configured to receive an image signal as input and to output the target description.

The inventors of the present invention have observed that labeled data is often nonexistent for audio and video scenes (especially with multiple audio tracks or binaural audio tracks), but that image processing methods known to be able to describe environments can be used. For example, methods that perform semantic segmentation or depth determination can be used.

According to a particular embodiment, the description of the environment, the target description of the environment, and the training description of the environment include at least one of a semantic segmentation of a frame of the image training signal or a depth map of a frame of the image training signal.

The frame may be the middle frame of a segment for which sound is also acquired.

For a semantic segmentation, the neural network outputs a map in which pixel values indicate the type of objects (using predefined object types). This map may have the same resolution as the frames from the training image signal.

For depth maps, the neural network outputs a map in which pixel values indicate distance between a point (for example the location of the sound acquisition device used) and other objects present in the environment of the sound acquisition device.

The semantic segmentation maps and the depth maps outputted by the neural network which has been trained appear to be seen from the sound acquisition device used along the neural network of from any point in space selected relative to this sound acquisition device. By "seen from", what is meant is that the result is analogous to a segmentation map/depth map obtained from an image acquired by an image acquisition device located where the sound acquisition device is, for example.

The invention also provides a neural network trained using the method as defined above.

This neural network may be stored on a recording medium readable by a computer.

According to a particular embodiment, the neural network comprises, for each possible audio signal to be used as input, four convolutional layers, a concatenation module for concatenating the outputs of every four convolutional layers, and an ASPP module.

The invention also provides a system for training a neural network to output a description of the environment in the vicinity of at least one sound acquisition device on the basis of an audio signal acquired by the sound acquisition device, the system comprising:

a module for obtaining audio and image training signals of a scene showing an environment with objects generating sounds, a module for obtaining a target description of the environment seen on the image training signal, a module for inputting the audio training signal to the neural network so that the neural network outputs a training description of the environment, and a module for comparing the target description of the environment with the training description of the environment.

This system may be configured to perform all the embodiments of the method as defined above.

The invention also provides a system comprising at least one sound acquisition device and a neural network trained using the method as defined above. The invention also provides a vehicle comprising this system.

In one particular embodiment, the steps of the method are determined by computer program instructions.

Consequently, the invention is also directed to a computer program for executing the steps of a method as described above when this program is executed by a computer.

This program can use any programming language and take the form of source code, object code or a code intermediate between source code and object code, such as a partially compiled form, or any other desirable form.

The invention is also directed to a computer-readable information medium containing instructions of a computer program as described above.

The information medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

BRIEF DESCRIPTION OF THE DRAWINGS

Further features and advantages of the present disclosure will become apparent from the following description of certain embodiments thereof, given by way of illustration only, not limitation, with reference to the accompanying drawings in which.

DESCRIPTION OF EMBODIMENTS

We will now describe a method for training a neural network so that this neural network can describe an environment on the basis of an audio signal acquired by a sound acquisition device. For example, the neural networks described herein can produce segmentation maps or depth maps in a manner which is similar to the methods known in the prior art which use images as inputs.

The method uses an assembly of one or several sound acquisition devices and one camera to acquire training data. However, when the trained neural network will be used to describe environments, it should be noted that it may use sound acquisition devices arranged in a manner which differs from the one used during training. Calibration steps may be used to determine the best arrangements of sound acquisition devices both during training and during use of the neural network.

In the below described example, several sound acquisition devices are used, and these are binaural sound acquisition devices. While labeled training data exists for simple audio/video (or audio/image) signals, it does not exist for more complex audio signals combined with videos.

By labeled, what is meant is that the expected output of the neural network is known for a given input. For example, if the neural network is expected to produce semantic segmentation maps, then the labels are semantic segmentation maps associated with video and complex audio signals (for example multiple binaural signals).

The method described herein is particularly useful to detect objects present on a street such as motorcycles, etc.

Figure 1:
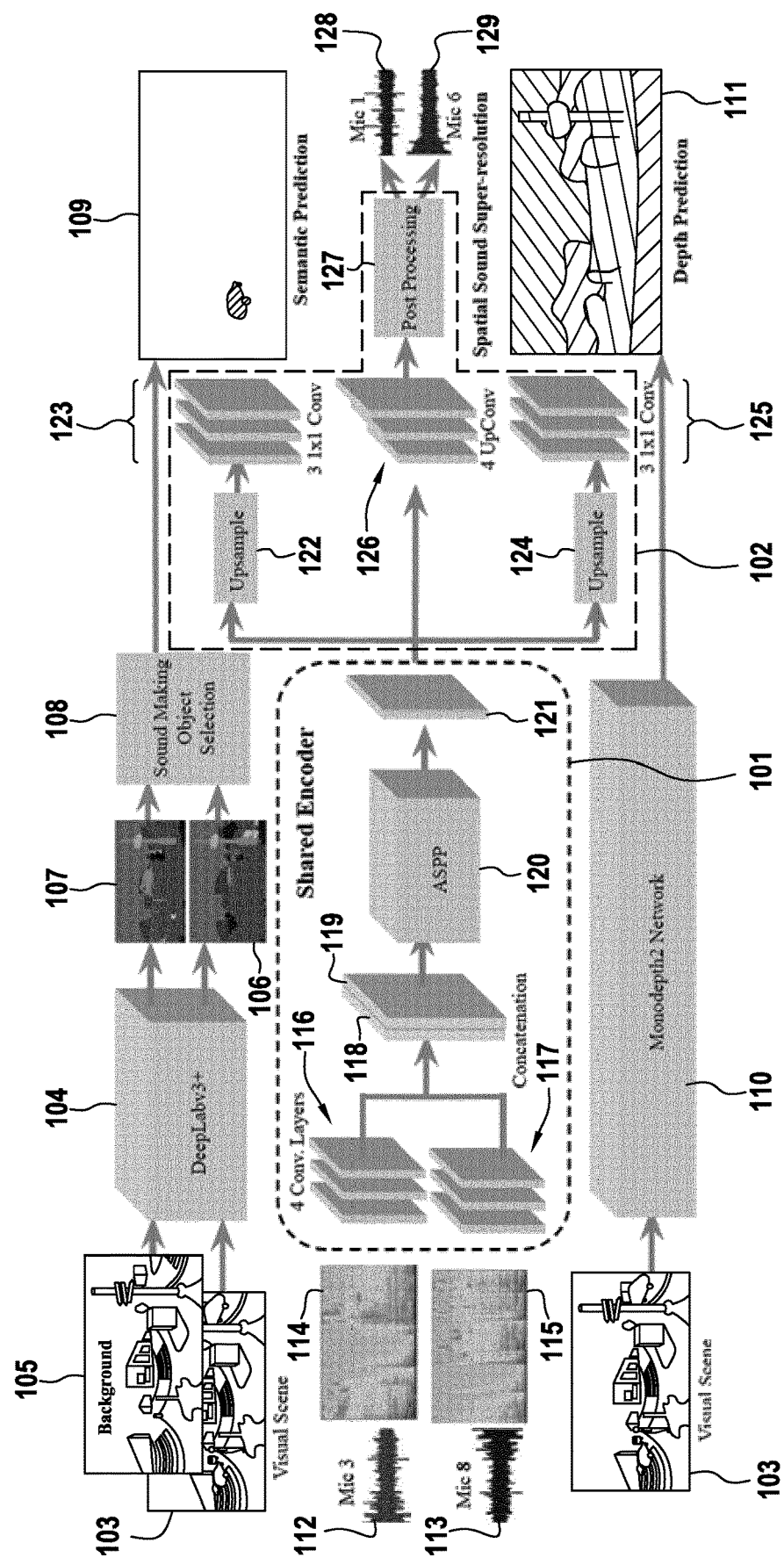
FIG. 1 is a block diagram illustrating an implementation of the method for training.

On FIG. 1, the architecture of the neural network to be trained is shown along with the elements required to train this neural network. This neural network comprises an encoder portion 101 and a decoder portion 102. These two portions will be trained and until they can be used to describe environments on the basis of audio signals, more precisely, in the described embodiment, semantic maps and depth maps can be obtained as descriptions of an environment.

Training this neural network will now be described. In a first step, audio and video training signals of a scene showing an environment with objects emitting sounds is acquired, with an assembly which will be described in more detail on FIG. 2. In the embodiment described herein, a video training signal is used, this video training signal is a specific image signal comprising multiple frames.

For example, the acquired signals may have a duration of two seconds and show a scene in a street. Training video signal 103 is shown on the figure. In order to obtain a semantic segmentation map, a single frame from the two seconds video is selected, for example the middle frame. This frame is inputted into a pre-trained neural network 104 such as the DeepLabv3+ network well known to the person skilled in the art. This neural network 104 may have been trained on the training set described in "The cityscapes dataset for semantic urban scene understanding" (M. Cordts, M. Omran, S. Ramos, T. Rehfeld, M. Enzweiler, R. Benenson, U. Franke, S. Roth, and B. Schiele, In Proc. of the IEEE Conference on Computer Vision and Pattern Recognition (CVPR), 2016).

It should be noted that many objects that can be detected to not emit sound, such as sky, road, parked cars. Thus, the neural network 104 is configured to also take the background 105 (containing these silent objects) as input.

The background image for a given sequence of T frames is calculated as:

$$I_{bg}(h,w) = \text{Mode}\{I_1(h,w), I_2(h,w), \ldots, I_T(h,w)\}$$

Wherein $I_{bg}(h, w)$ is the pixel value of the background image 105 for a pixel of indexes (h, w), $I_i$ is the image of index i in the sequence of T frames, and Mode$\{\cdot\}$ computes the number which appears most often in a set of numbers. It should be noted that the background estimation can be performed on a longer video sequence, for example of 5 to 7 minutes.

The neural network outputs a first semantic segmentation map 106 based on frame 103 and a second segmentation map 107 based on the background 105.

In the present example, a limited number of objects of interest are selected to appear on the final semantic segmentation map. These objects have to be moving and can emit sound while moving. In the illustrated example, the selected objects are car, train, and motorcycle.

An additional module 108 is used to perform the following operation:

$$S(h, w) = \begin{cases} 1 & \text{if } Y_t(h, w) \in \{\text{car, train, motorcycle}\} \text{ and} \\ & \quad Y_t(h, w) \neq Y_{bg}(h, w) \\ 0 & \text{otherwise} \end{cases}$$

Wherein $Y_t(h,w)$ is the semantic label for the pixel of indexes (h, w) for the first segmentation map 106 and $Y_{bg}(h, w)$ is the semantic label for the pixel of indexes (h, w) for the second segmentation map 107. The outputted segmentation map S is assigned reference 109 on the figure. This segmentation map is a target description. On S, the pixel value is 1 if there is a moving car, train, or motorcycle. The segmentation map 109 will be used for training the neural network comprising the encoder 101 and the decoder 102.

In order to obtain a depth map, the frame 103 mentioned above is inputted to a pre-trained MonoDepth2 neural network 110, as disclosed in document "Digging into self-supervised monocular depth estimation" (C. Godard, O. M. Aodha, M. Firman, and G. J. Brostow, In Proceedings of the IEEE International Conference on Computer Vision, pages 3828-3838, 2019). A depth map 111 is obtained which is a target description.

It should be noted that the neural network 110 can be trained on the set disclosed in document "Vision meets robotics: The kitti dataset» (A. Geiger, P. Lenz, C. Stiller, and R. Urtasun, International Journal of Robotics Research (IJRR), 2013).

The architecture of the encoder 101 will now be described. In the illustrated example, two sound acquisition devices are used to obtain two audio signals 112 and 113. In this example, the two sound acquisition devices are binaural sound acquisition devices. These may be obtained on the above-mentioned segment of 2 seconds.

A pre-processing step may be performed in which the signals 112 and 113 are converted to log-spectrogram representations, respectively referenced as 114 and 115. Each representation is then inputted to the encoder 101 and more precisely to a group of four convolutional layers 116 for the representation 114 and to another group of four convolutional layers 117.

Should more signals be used as input, more groups of four convolutional layers can be used.

Each convolutional layer performs a 4×4 convolution with a stride of 2. A concatenation is then performed, as represented on the figure by the joined arrow, to obtain a concatenated feature map. A batch normalization layer 118 then processes the concatenated feature map before a ReLU layer 119 (Rectifier Linear Unit) processes the output of layer 118.

After the ReLU layer, the processed concatenated feature map is further passed to a Atrous Spatial Pyramid Pool module 120, also known under the acronym ASPP. ASPP modules are known from document "Semantic image segmentation with deep convolutional nets, atrous convolution, and fully connected crfs" (L.-C. Chen, G. Papandreou, I. Kokkinos, K. Murphy, and A. L. Yuille, IEEE transactions on pattern analysis and machine intelligence, 40(4):834-848, 2017).

In this example, the ASPP module 120 has one 1×1 convolution and three 3×3 convolutions with dilatation rates of 6, 12, and 18. Each of the convolutions has 64 filters and a batch normalization layer. The ASPP module 120 concatenates all the features and passes them through a 1×1 convolutional layer to generate binaural sound features in a feature map 121 which will be used as input to the decoder 102.

In the illustrated example, the decoder 102 and the neural network to be trained have three outputs.

A first output is a semantic segmentation map which will be obtained after processing the feature map 121 in an upsampling module 122 and a group of three 1×1 convolutional layers 123. In this group of three convolutional layers, the first two are followed by a batch normalization and a ReLu activation, while the third is followed by a softmax activation, well known to the person skilled in the art. A semantic segmentation map is obtained which will be compared to the semantic segmentation map 109.

A second output is a depth map which will be obtained after processing the feature map 121 in an upsampling module 124 and a group of three 1×1 convolutional layers 125. In this group of three convolutional layers, the first two are followed by a batch normalization and a ReLu activation, while the third is followed by a softmax activation, well known to the person skilled in the art. A depth map is obtained which will be compared to the depth map 111.

The obtained semantic segmentation and depth maps are a description of the environment in which the signals 112 and 113 have been acquired.

In order to better train the neural network (encoder 101 and decoder 102), the decoder 102 further comprises four up-convolution layers 126 to obtain a binaural feature map, with each up-convolution layer followed by a batch normalization layer and a ReLu activation layer. The last layer is followed by a sigmoid layer which predicts a complex spectrogram. A post-processing module 127 then produces two audio signals (here binaural audio signals) 128 and 129. These two audio signals ae configured to illustrate the sound acquired by additional sound acquisition devices places at locations which differ from the locations of the sound acquisition devices used to acquire signals 112 and 113.

In order to train the neural network, the following loss function is used:

$$L = L_{semantic} + \lambda_1 L_{depth} + \lambda_2 L_{s^3_r}$$

In which $\lambda_1$ and $\lambda_2$ are weights chosen to balance the losses, $L_{semantic}$ is a cross-entropy loss for the semantic segmentation mask based on the difference between the semantic segmentation mask 109 and the output of the three layers 123, $L_{depth}$ is a L2 loss used to minimize the distance between predicted depth values (the output of the three layers 125) and the depth map 111, and $L_{s^3_r}$ is a L2 loss used to minimize the distance between the signals 128 and 129 and signals acquired by additional sound acquisition devices at associated locations.

The person skilled in the art will be able to select the two weights according to the application.

Training can then be performed on various acquired signals in an iterative manner, for example using the stochastic gradient method.

Figure 2:
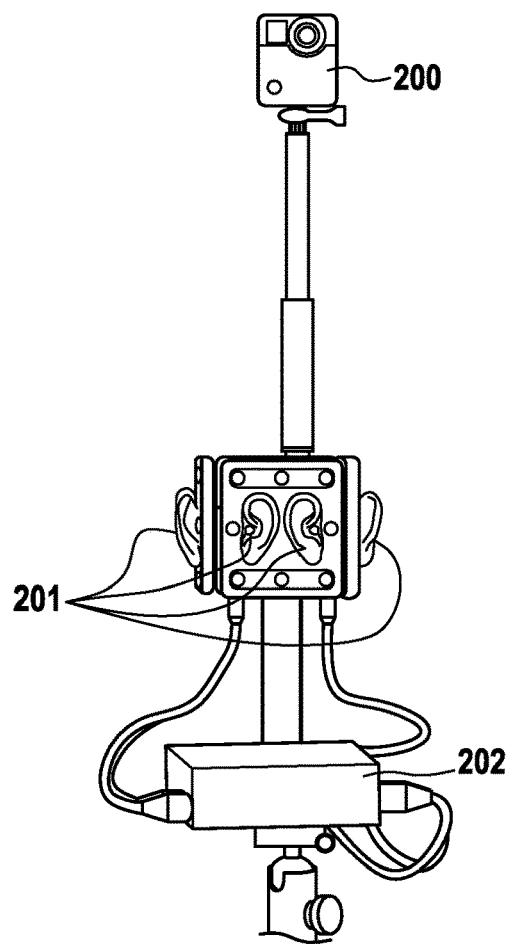
FIG. 2 is an example of rig used to acquire training data.

FIG. 2 shows an example of rig or assembly used during training to acquire binaural audio signals and 360° video signals. In the illustrated example, the camera 200 is a camera manufactured by the American company GOPRO under the commercial name FUSION which records 360° videos. This camera is mounted on a rod above a plurality of binaural sound acquisition devices 201, for example 3Dio Omni Binaural Microphones. The sound acquisition devices are connected to a multitrack recorder 202 such as the zoom F8 Multi-Track Field recorder. The assembly, or rig, is configured so that the camera is placed above so as to prevent occlusions in front of the camera in scenes acquired in the street.

Figure 3:
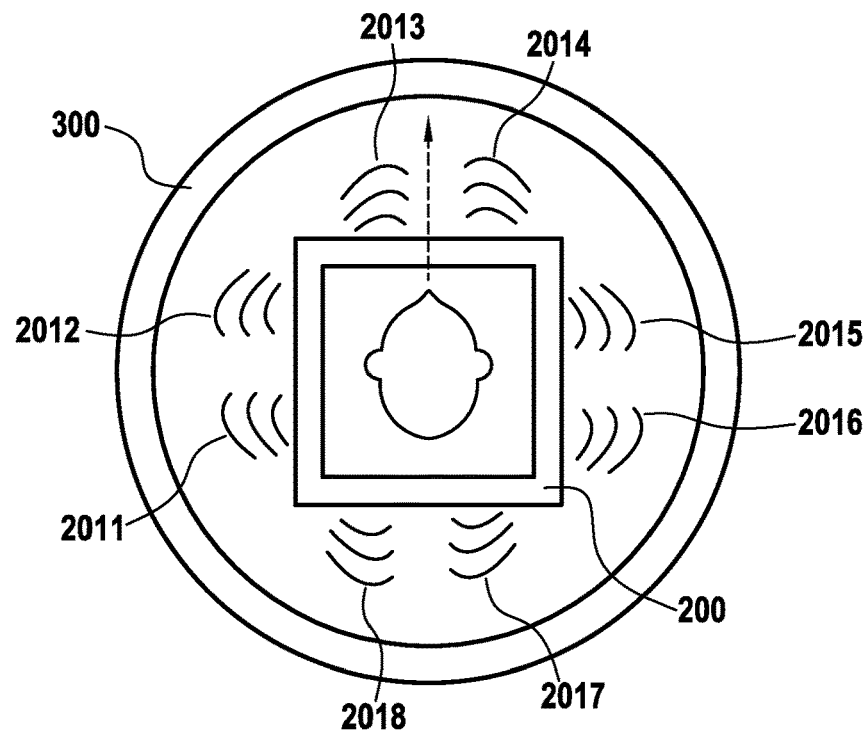
FIG. 3 is another view of the rig.

FIG. 3 shows a top view of the rig of FIG. 2. The sound acquisition devices of this figure are referenced differently as their position is meaningful. More precisely, devices 2011 and 2012 are placed on what is called the left side, devices 2013 and 2014 are placed on what is called the front side, devices 2015 and 2016 are placed on what is called the right side, and devices 2017 and 2018 are placed on what is called the back side.

The invention is not limited to the use of this rig and other arrangements are possible.

Also, on the figure, reference 300 represents the angle of view of the camera 200.

In the example of FIG. 1, sound acquisition devices 2013 and 2018 were used to obtain respectively signals 112 and 113, while signals 128 and 129 represent the signals which should have been acquired by devices 2011 and 2016, respectively.

This prediction of audio signal is used to improve the training of the overall neural network, which provides spatial sound super-resolution. This is also based on the effect of head movements of humans (especially rotations) to better localize sounds. In the illustrated example, four angles are considered: 0°, 90°, 180°, and 270°.

By way of example, if $x^{L_0}(t)$ and $x^{R_0}(t)$ are received signals on left and right side at azimuth 0°, then using the above described neural network, it is possible to predict the signals $x^{L_\alpha}(t)$ and $x^{R_\alpha}(t)$ at azimuth $\alpha°$. Using a method close to the one of document "2.5 d visual sound" (R. Gao and K. Grauman, IEEE Conference on Computer Vision and Pattern), the predicted signals are:

$$x^{DL_\alpha}(t) = x^{L_0}(t) - x^{L_\alpha}(t)$$

$$x^{DR_\alpha}(t) = x^{R_0}(t) - x^{R_\alpha}(t)$$

With $\alpha$ being equal to 90°, 180°, or 270°.

It should be noted that it is possible to operate on spectrogram representations rather than waveforms. Then, the spectrograms of the difference are predicted, and raw waveforms can be obtained by applying inverse short-time Fourier transform to obtain signals.

Figure 4:
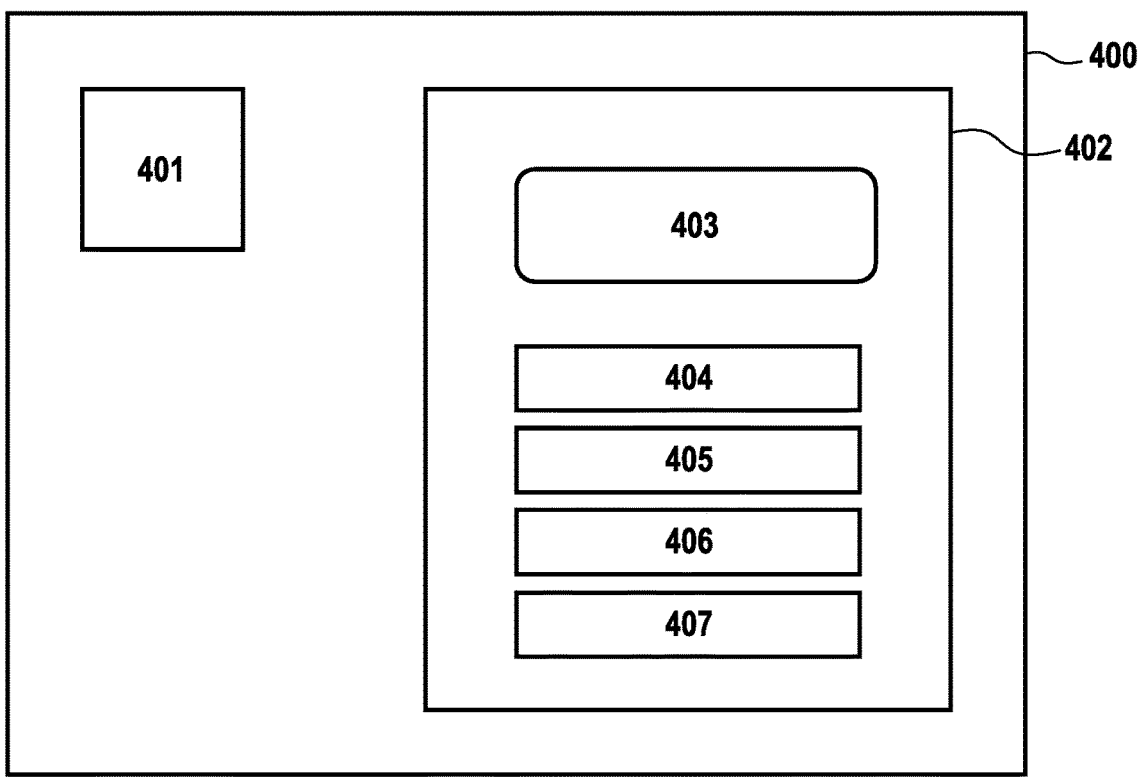
FIG. 4 is a schematic representation of a system for training a neural network according to an example.

FIG. 4 is an example of a schematic representation of a system 400 for training a neural network. This system can perform the training discussed in reference to FIGS. 1 to 3.

The system may be a computing system. It includes a processor 401 and a nonvolatile memory 402 in which the neural network 403 is stored.

To perform the training, the nonvolatile memory comprises a computer program comprising the following instructions:

Instructions 404 which, when executed by the processor 401, obtain audio and image training signals of a scene showing an environment with objects generating sounds;

Instructions 405 which, when executed by the processor 401, obtain a target description of the environment seen on the image training signal;

Instructions 406 which, when executed by the processor 401, input the audio training signal to the neural network so that the neural network outputs a training description of the environment;

Instructions 407 which, when executed by the processor 401, compare the target description of the environment with the training description of the environment.

The above instructions 404 to 407 form, in combination with the processor, modules of the system 400.

Figure 5:
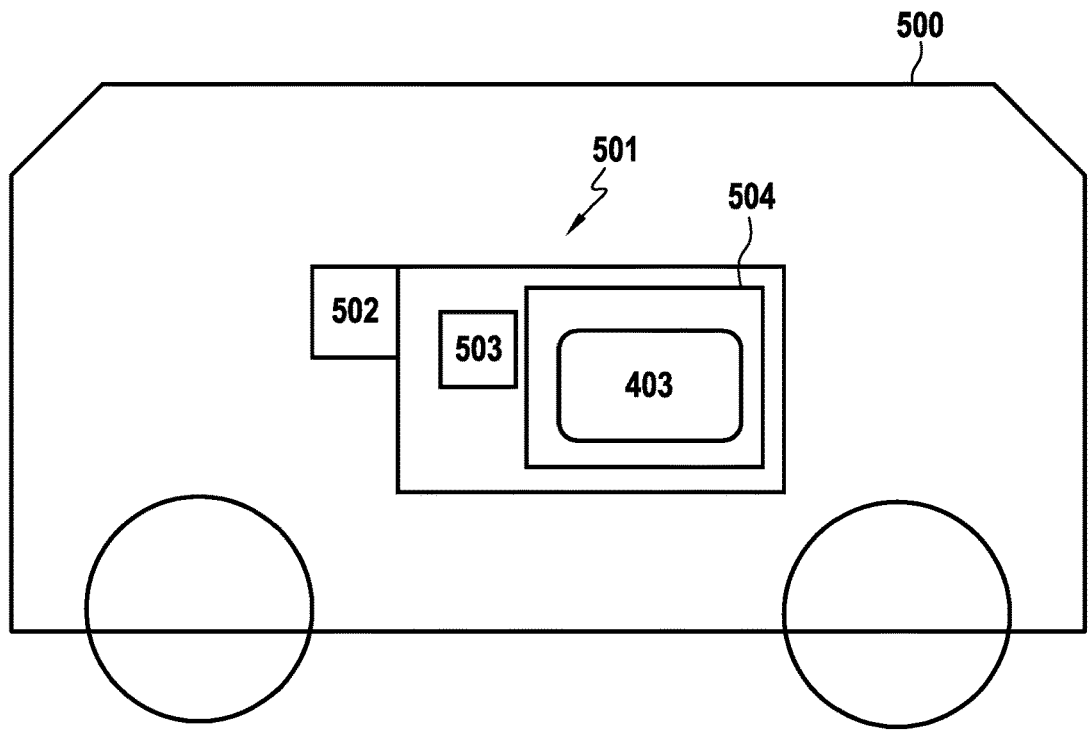
FIG. 5 is a schematic representation of a vehicle according to an example.

FIG. 5 shows a vehicle 500 comprising a system 501 equipped with a sound acquisition device 502, for example a binaural sound acquisition device, a processor 503, and a nonvolatile memory 504. In the nonvolatile memory 504, the neural network 403 of FIG. 4 is stored so as to describe the environment around the vehicle on the basis of the sounds acquired by device 502.

The above method has been tested using the Intersection over Union method for the semantic prediction task, and has proven to be reliable. Depth prediction has also proven to be reliable when the three outputs of the neural network were used (semantic, depth, additional sound).

It should be noted that the trained neural network can be particularly useful in situation where visibility is low (for example in the presence of rain or fog), to detect moving objects that emit sounds like cars, motorcycles, or trains.

Although the present invention has been described above with reference to certain specific embodiments, it will be understood that the invention is not limited by the particularities of the specific embodiments. Numerous variations, modifications and developments may be made in the above-described embodiments within the scope of the appended claims.

The invention claimed is:

1. A method for training a neural network to output a description of the environment in the vicinity of at least one sound acquisition device on the basis of an audio signal acquired by the sound acquisition device, the method comprising:

obtaining audio and image training signals of a scene showing an environment with objects generating sounds, obtaining a target description of the environment seen on the image training signal, inputting the audio training signal to the neural network so that the neural network outputs a training description of the environment, and comparing the target description of the environment with the training description of the environment, wherein the description of the environment, the target description of the environment, and the training description of the environment include at least one of a semantic segmentation of a frame of the image training signal or a depth map of a frame of the image training signal.

2. The method of claim 1, wherein the audio training signal is acquired with a plurality of sound acquisition devices.

3. The method of claim 2, wherein the sound acquisition devices of the plurality of sound acquisition devices are all spaced apart from each other.

4. The method of claim 2, wherein at least one additional sound acquisition device is used to acquire an audio signal at a location which differs from the location of any one of the sound acquisition devices of the plurality of sound acquisition devices, the neural network being further configured to determine at least one predicted audio signal representative of the audio signal that is acquired by the at least one additional sound acquisition device, and the method further comprising comparing the predicted audio signal with an audio signal acquired by the at least one additional sound acquisition device.

5. The method of claim 1, wherein the audio training signal is acquired using at least one binaural sound acquisition device.

6. The method of claim 1, wherein the image training signal is acquired using a 360 degrees camera.

7. The method of claim 1, wherein the target description is obtained using at least one pre-trained neural network configured to receive an image signal as input and to output the target description.

8. A neural network trained using the method of claim 1.

9. The neural network of claim 8, comprising, for each possible audio signal to be used as input, four convolutional layers, a concatenation module for concatenating the outputs of every four convolutional layers, and an ASPP module.

10. A system comprising at least one sound acquisition device and
a neural network in accordance with claim 8.

11. A vehicle comprising a system according to claim 10.

12. A system for training a neural network to output a description of the environment in the vicinity of at least one sound acquisition device on the basis of an audio signal acquired by the sound acquisition device, the system comprising:

a module for obtaining audio and image training signals of a scene showing an environment with objects generating sounds, a module for obtaining a target description of the environment seen on the image training signal, a module for inputting the audio training signal to the neural network so that the neural network outputs a training description of the environment, and a module for comparing the target description of the environment with the training description of the environment, wherein the description of the environment, the target description of the environment, and the training description of the environment include at least one of a semantic segmentation of a frame of the image training signal or a depth map of a frame of the image training signal.

13. A non-transitory recording medium readable by a computer and having recorded thereon a computer program including instructions for executing a method for training a neural network to output a description of the environment in the vicinity of at least one sound acquisition device on the basis of an audio signal acquired by the sound acquisition device, the method comprising:

obtaining audio and image training signals of a scene showing an environment with objects generating sounds, obtaining a target description of the environment seen on the image training signal, inputting the audio training signal to the neural network so that the neural network outputs a training description of the environment, and comparing the target description of the environment with the training description of the environment, wherein the description of the environment, the target description of the environment, and the training description of the environment include at least one of a semantic segmentation of a frame of the image training signal or a depth map of a frame of the image training signal.

\* \* \* \* \*